Dec. 12, 1961     G. B. STILLWAGON, JR     3,012,315

METHOD OF MAKING UNIVERSAL JOINTS

Original Filed May 5, 1955

INVENTOR.
GEORGE B. STILLWAGON JR.

BY

HIS ATTORNEYS

United States Patent Office 3,012,315
Patented Dec. 12, 1961

3,012,315
METHOD OF MAKING UNIVERSAL JOINTS
George B. Stillwagon, Jr., 546 Hathaway Road, Dayton, Ohio, assignor of one-half to Kenneth G. Fraser, Dayton, Ohio
Original application May 5, 1955, Ser. No. 506,127, now Patent No. 2,896,431, dated July 28, 1959. Divided and this application Mar. 21, 1958, Ser. No. 722,931
4 Claims. (Cl. 29—423)

This invention relates to a universal joint and method of making same, and more particularly to a universal joint wherein a portion of the joint is elastomeric material.

The present application is a division of my copending application Serial No. 506,127, filed May 5, 1955, entitled Universal Joint and Method of Making Same, now Patent No. 2,896,431, issued July 28, 1959.

The invention has for its object the provision of a more simply constructed universal joint, made of a minimum number of parts, and is therefore more simple and more efficient in operation.

A further object of the invention is the provision of a universal joint in which a portion of the joint is made of vulcanizable material which is molded into the joint in the process of assembling the parts, and is subsequently vulcanized.

A further object of the invention is the provision of a method of making a bonded universal joint wherein an interstice or groove is formed in an elastomeric bonding element during the vulcanizing process by means of a low temperature melting insert which is removed.

A further object of the invention is the use of a process which makes possible universal flexibility in the joint without sacrificing strength and durability.

Other objects and advantages reside in the construction of parts, the combination thereof, the method of manufacture, and the mode of operation, as will become more apparent from the following description.

Referring to the drawing.

Figures 1, 2:
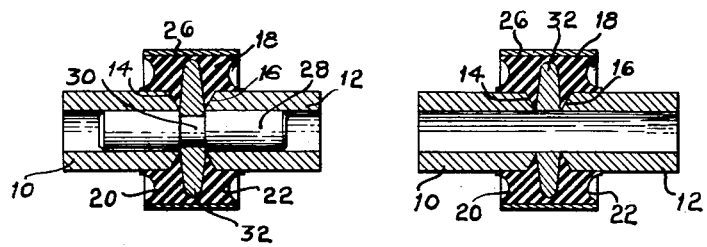
FIGURE 1 is a cross section of the universal joint in one state in its manufacture, showing the parts assembled ready for vulcanizing.
FIGURE 2 is a cross sectional view showing the joint after vulcanizing, with a temporary supporting pin removed.

Referring more in detail to the drawing, the completed universal joint consists of a pair of coupling members 10 and 12 having beveled adjacent end surfaces 14 and 16 respectively, and an elastomeric bonding element 18 provided with annular depressed curved surfaces 20 and 22 and a centrally located inwardly directed annular groove or circular cavity 24, and a metallic sleeve 26 surrounding the bonding element.

Figures 3, 4:
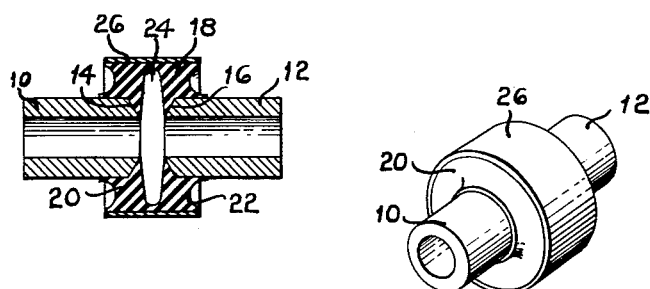
FIGURE 3 shows the universal joint completed, after the pin has been withdrawn and the material of an insert has been melted out.
FIGURE 4 is a perspective view of the completed universal joint.
Figure 5:
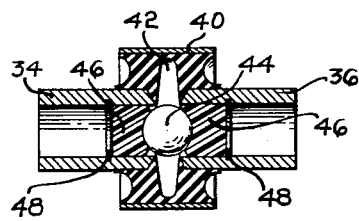
FIGURE 5 is a cross sectional view of a modified form of the universal joint.

The formation of the elastomeric member 18 is such as to allow free universal movement. A pair of annular concave surfaces 20 and 22 are molded into the opposite exposed surfaces surrounding the coupling members. The internally directed annular cavity 24 contributes to this flexibility, as do also the beveled adjacent ends of the coupling members. The joint completed and ready for use is shown in FIGURE 3.

The steps in the manufacture of the universal joint are as follows: A metal pin 28 is provided with an annular reduced portion or recess 30. The diameter of the pin 28 is such as to fit snugly into each of the coupling members 10 and 12. A metal washer 32 is cast on the pin 28 fitting into the annular recess 30. The diameter of the washer 28 is larger than the exterior diameter of the coupling members 10 and 12, and of smaller diameter than the interior of the enclosing sleeve 26. The washer 32 is made of a metal whose melting point is lower than the highest permissible vulcanizing temperature of the elastomeric bonding element 18.

In assembling the parts of the joint, prior to the vulcanizing process, each end of the pin 28 is inserted into a coupling member, so that the washer 32 protrudes between them and beyond their outer circumference.

The beveled end surfaces 14 and 16 form annular V-pockets. The sleeve cover is fitted in place, and an unvulcanized elastomeric moldable substance is molded into and around the joint, filling the V-pockets, and pressed to form the concave surfaces 20 and 22.

The joint is now vulcanized, to harden and season the bonding element 18. The initial temperature is lower than the melting point of the metal of the washer 32. This permits partial curing of the elastomeric material 18, sufficient to hold its shape.

When the vulcanizing process is partially completed, the pin 28 is driven through the members 10 and 12 to shear the inner edge of the insert. The assembly is then heated above the melting point of the insert 32, and the melted metal of the washer is drained out. The resulting product is the completed joint shown in FIGURE 3. The cavity formed in the bonding element, together with the beveled end surfaces 14 and 16 and the depressions 20 and 22, allows extensive flexing of the joint, and there is sufficient reinforcement to render the joint extremely durable. For some types of elastomeric materials, a form is used to hold the material in place until it solidifies sufficiently to hold its shape.

The elastomeric material may consist of rubber, synthetic rubber such as neoprene, Buna, et cetera, or it may consist of any other suitable plastic material having the proper elastomeric properties and bondable to the metallic parts, either directly or through the use of suitable bonding material.

In the modification shown in FIGURE 4, a pair of coupling members 34 and 36 are secured together in the same manner described above in connection with the form shown in FIGURES 1–4 inclusive. A vulcanizable bonding member is molded about the ends of the couplings, and inside a sleeve member 40. A cavity 42 is formed in the bonding member as before. Positive alignment is added to the joint by the addition of a ball bearing member 44 which is inserted into the joint and is retained by a pair of yieldable or flexible packing members 46. These, in turn are held in place, each by a spring ring 48, which is sprung into and held in place by an annular groove formed in the interior surface of each coupling member. This gives proper alignment and a limited movement under compression to a joint where compressing movement is to be resisted.

The packing members 46 are provided with concave surfaces engaging the ball member 44. The packing member may be made from nylon or any other suitable material.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of making a universal joint which comprises the steps of providing an annular groove midway of the ends of a pin, casting a washer of low melting point alloy on said pin with a portion thereof seated in said groove, inserting each end of said pin into the adjacent hollow end of a coupling member, placing a sleeve member about said washer, molding a vulcanizable bonding element into said sleeve member, about said washer, and about the adjacent ends of said coupling members, vulcanizing said bonding element sufficiently to hold the shape thereof at a temperature below the melting point of the alloy of said washer, forcing said pin out of said coupling members and simultaneously shearing the portion of said washer seated in said groove from the body of said washer, then subjecting said joint to a higher temperature sufficient to melt said washer and draining away the molten material thus forming an annular cavity in the bonding element.

2. The method of forming an elastomeric element having a cavity and an enlargement of said cavity within the body thereof, which method comprises the steps of providing a first elongate insert having a substantially uniform cross-sectional shape for forming said cavity, said first insert having a melting point exceeding the curing temperature of said elastomeric element, mounting a second insert about a transverse groove in said first insert for forming the enlargement of said cavity, a portion of said second insert being seated in said groove, said second insert having a melting point in the range of the curing temperature of said elastomeric element, molding uncured elastomeric material about said second insert to form said elastomeric element, there being a portion of said first insert projecting outside said elastomeric element, partially curing the elastomeric element at a temperature below the melting point of said inserts, sliding said first insert from said second insert and the partially cured elastomeric element in a direction transverse to said groove so as to shear the portion of said second insert seated in said groove, final curing said elastomeric element at a temperature exceeding the melting point of said second insert, and draining the molten material of said second insert from the finally cured elastomeric element.

3. The method of making a bonded universal joint which comprises casting a low melting point annular insert about an annular groove located in a pin intermediate its ends, inserting the opposite ends of said pin into adjacently positioned hollow end portions of a pair of coupling members, placing a sleeve about the joint as formed, molding uncured elastomeric material into said sleeve about said annular insert and about the ends of said coupling members, submitting the joint as formed to a partial curing process at a temperature below the melting point of said annular insert, removing said pin from said annular insert, thereby shearing the portion of said insert seated in said annular groove, and final curing the elastomeric material at a temperature exceeding the melting point of said annular insert permitting the annular insert to melt and flow out of the joint.

4. The method of forming a cavity in a molded element of curable elastomeric material comprising the steps of forming an insert having the shape of the cavity to be formed, said insert comprising a body of low melting alloy and a pin anchored to said body, said pin being inseparable from said body except by shearing a portion of said body, molding the elastomeric element, while uncured, about said insert, said pin extending outside said molded element, applying heat to the molded element to at least partially cure same at a temperature below the melting temperature of said alloy to fix the shape of the molded element while said insert remains substantially rigid, removing said pin from the body of said insert thus shearing a portion of said body, removal of said pin providing a passageway from the sheared portion of said body to the exterior of said molded element, thereafter heating said molded element to a temperature exceeding the melting temperature of said alloy to melt said body while further curing said molded element, and draining the molten material of said body from the molded element through the passageway created by removal of said pin.

References Cited in the file of this patent

UNITED STATES PATENTS

| | | |
|---|---|---|
| 1,599,924 | Sanborn | Sept. 14, 1926 |
| 2,251,804 | Reuter et al. | Aug. 5, 1941 |
| 2,444,904 | Worley | July 6, 1948 |